United States Patent [19]
Fujiki et al.

[11] Patent Number: 6,040,361
[45] Date of Patent: Mar. 21, 2000

[54] ORGANOPOLYSILOXANE COMPOSITIONS

[75] Inventors: Hironao Fujiki; Kei Miyoshi; Hironobu Muramatsu, all of Gunma-ken, Japan

[73] Assignee: Shin-Etsu Chemical Co., Ltd., Tokyo, Japan

[21] Appl. No.: 09/193,850

[22] Filed: Nov. 18, 1998

[30] Foreign Application Priority Data

Nov. 19, 1997 [JP] Japan .................................. 9-335150

[51] Int. Cl.$^7$ .................................................. C08G 77/08
[52] U.S. Cl. ............................ 523/209; 528/15; 525/478
[58] Field of Search ............................... 528/15; 523/209; 525/478

[56] References Cited

U.S. PATENT DOCUMENTS

| | | | |
|---|---|---|---|
| 3,445,420 | 5/1969 | Kookootsedes et al. | 260/37 |
| 3,699,073 | 10/1972 | Wada et al. | 260/37 SB |
| 4,061,609 | 12/1977 | Bobear | 260/9 |
| 4,481,341 | 11/1984 | Schlak et al. | 525/478 |
| 4,874,667 | 10/1989 | Lee et al. | 428/402.22 |
| 5,009,957 | 4/1991 | Lee et al. | 428/402.22 |
| 5,015,716 | 5/1991 | Togashi et al. | 528/15 |
| 5,017,645 | 5/1991 | Ong et al. | 524/726 |
| 5,877,237 | 3/1999 | Nakanishi et al. | 523/211 |

OTHER PUBLICATIONS

English Abstract for JP 63056563.
English Abstract for JP 5202193.
English Abstract for JP 7196921.

Primary Examiner—Margaret G. Moore
Attorney, Agent, or Firm—Millen, White, Zelano & Branigan, P.C.

[57] ABSTRACT

More than about 9/10 (by weight as a platinum group metal atom) of the necessary amount of a platinum group metal catalyst enclosed in a compound having a melting or softening point of 40–200° C., less than about 1/10 (by weight as a platinum group metal atom) of the necessary amount of a platinum group metal catalyst, and an addition reaction retarder are blended in an organopolysiloxane composition comprising an organopolysiloxane containing alkenyl or hydroxyl radicals and an organohydrogenpolysiloxane. The composition has improved shelf stability, an increased pot life, good curing capability, and fast curing upon heating.

20 Claims, No Drawings

ORGANOPOLYSILOXANE COMPOSITIONS

BACKGROUND OF THE INVENTION

1. Field of the Invention

This invention relates to organopolysiloxane compositions having improved shelf stability and curing capability.

2. Prior Art

From the past, addition reaction between aliphatic unsaturated radicals and hydrosilyl radicals promoted by platinum group metal catalysts is utilized in a variety of applications. Inter alia, platinum compounds are used as catalytic compounds finding the most versatility in the field. Beside organic synthetic reaction such as synthesis of silalkane bonds, platinum compounds are also utilized in the silicone industry as means for crosslinking addition reaction type resins and rubbers. Applications include use as adhesives, coating agents, potting agents, gelling agents, and foaming agents, and extrusion, compression molding or injection molding of liquid or millable rubbers.

In the silicone industry, a fast-curing composition having a long shelf life is demanded from the working and operating standpoints. For compositions utilizing addition reaction as the crosslinking system, a number of proposals have been made on controlling agents for controlling the shelf life and pot life of platinum group catalysts. The controlling agents proposed heretofore include benzotriazole compounds (JP-B 25069/1965 corresponding to U.S. patent application Ser. No. 202,974 filed on Jun. 18, 1962), acetylene alcohol compounds (JP-B 31476/1969 corresponding to U.S. Pat. No. 3,445,420), vinyl-containing polysiloxane compounds (JP-B 10947/1973 corresponding to U.S. Pat. No. 3,699,073), hydroperoxides (JP-B 20340/1982 corresponding to U.S. Pat. No. 4,061,609), and amine compounds (JP-A 56563/1988 corresponding to EP 257,970). However, such chemical control has a limit in finding a compromise between pot life and curing rate, failing to meet the current market demand for prolonged storage and fast curing.

From the above standpoint, an attempt was made to enclose platinum group catalysts in thermoplastic resins or silicone resins so that the catalysts may be released to silicone compositions at elevated temperature causing the thermoplastic resins or silicone resins to be melted. This technology is disclosed in many patents, for example, JP-A 134786/1974, 37053/1983 corresponding to U.S. Pat. No. 4,481,341, 51140/1989 corresponding to U.S. Pat. Nos. 4,874,667 and 5,009,957, 9448/90 corresponding to U.S. Pat. No. 5,015,716, 14244/1990 corresponding to U.S. Pat. No. 5,017,654, 202193/1993 corresponding to EP 543,410, and 196921/1995 corresponding to EP 661,349.

These microcapsulation methods, however, have a likelihood of local curing because the platinum group metal catalyst is locally distributed in a silicone composition and in high concentrations.

To overcome this problem, JP-A 46962/1992 proposes to use acetylene alcohol as a reaction retarder, thereby preventing local curing reaction. This composition gives rise to several inconvenient problems when applied to a variety of areas.

For example, in the application as heat curing type silicone rubber adhesive wherein a tackifier component is added to these compositions, if the continuous manufacturing line is set at a relatively low temperature so that a certain time is required for the thermoplastic resin having the platinum group metal catalyst embedded therein to melt, then curing and bonding sometimes become incomplete in the manufacturing line. In another application, a hydroxyl source such as alcohol or water is blended in the composition whereby a foam is manufactured in a heating line. It is known that a minor amount of expansion by dehydrogenation reaction at the initial of reaction affords nuclei for expansion so that a satisfactory foam is obtained. However, the reaction retarder acts to suppress this initial expansion too, failing to form a satisfactory foam. In a further application wherein the compositions are used as millable type addition curing materials to mold cables and tubes, if the compositions are molded and vulcanized at a high speed, tack is left on the surface, failing to obtain molded products having a smooth surface.

Therefore, an object of the invention is to provide an organopolysiloxane composition having solved the aforementioned problems.

SUMMARY OF THE INVENTION

The present invention provides an organopolysiloxane composition comprising (A) 100 parts by weight of an organopolysiloxane of the following general formula (1):

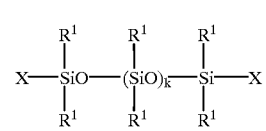

(1)

wherein $R^1$ and X are independently selected from the group consisting of alkyl, aryl, aralkyl, and alkenyl radicals having 1 to 10 carbon atoms, substituted ones of these radicals wherein some of the hydrogen atoms attached to carbon atoms are replaced by halogen atoms, and hydroxyl radicals, k is an integer of at least 4, alkenyl or hydroxyl or both radicals account for 0.001 to 1 mol % of the entire $R^1$ and X radicals, (B) 0.1 to 50 parts by weight of an organohydrogenpolysiloxane having at least three hydrogen atoms each attached to a silicon atom in a molecule, represented by the following general formula (2):

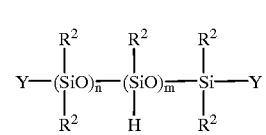

(2)

wherein $R^2$ is selected from the group consisting of alkyl, aryl, and aralkyl radicals having 1 to 10 carbon atoms, and substituted monovalent ones of these radicals wherein some of the hydrogen atoms attached to carbon atoms are replaced by halogen atoms, Y is hydrogen or $R^2$, m is an integer of at least 1, n is an integer inclusive of 0, the sum of m+n is an integer of 3 to 500, (C) 0 to 20 parts by weight of a compound having an active hydrogen radical, (D) a platinum group metal catalyst enclosed in a compound selected from the group consisting of thermoplastic organic resins, thermoplastic silicone resins, and heat-fusible compounds with a molecular weight of up to 1,000, all having a melting or softening point of 40 to 200° C., in an amount to give 1 to 1,000 parts by weight of platinum group metal atom per million parts by weight of the entire composition, (E) a platinum group metal catalyst in an amount to provide platinum group metal in an amount of up to 1/10 (by weight) of the amount of platinum group metal available from component (D), (F) 0.001 to 20 parts by weight of an addition reaction retarder, and (G) 0 to 1,000 parts by weight of a filler.

We have found that when at least about 9/10 (by weight) of the necessary amount of a platinum group metal catalyst enclosed in a compound having a melting or softening point of 40 to 200° C., at most about 1/10 (by weight) of the necessary amount of a platinum group metal catalyst per se which is not enclosed in a thermoplastic resin or other compound, and an addition reaction retarder are blended in an organopolysiloxane composition comprising an organopolysiloxane containing alkenyl or hydroxyl radicals and an organohydrogenpolysiloxane, the resulting composition has improved shelf stability, an increased pot life, good curing capability, and fast curing upon heating. Additionally, the composition has solved the aforementioned problems, that is, the problem of incomplete curing and bonding at relatively low line temperature in the application as heat curing type silicone rubber adhesive, the problem of failure to form a satisfactory foam due to the suppression of initial expansion, and the problem of a tacky surface of a millable type addition curing composition when molded and vulcanized at a high speed to form cables or tubes.

More particularly, according to the invention, at least 90% by weight (as a platinum metal atom) of the amount necessary to complete addition reaction within a predetermined time of the platinum group metal catalyst is protected with a thermoplastic resin or the like to restrain any change of the catalyst during storage, and up to 10% by weight (as a platinum metal atom) of the necessary amount of the platinum group metal catalyst is supplied in a conventional reaction retarding system based on chemical coordination. This assortment enables the composition to meet both storage stability and curing capability.

DETAILED DESCRIPTION OF THE INVENTION

In the organopolysiloxane composition of the invention, an organopolysiloxane is used as component (A) or a base polymer. The organopolysiloxane has substantially a linear structure and is of the general formula (1).

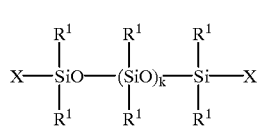

(1)

In formula (1), $R^1$ and X are independently selected from the group consisting of alkyl, aryl, aralkyl, and alkenyl radicals having 1 to 10 carbon atoms, preferably 1 to 8 carbon atoms, substituted ones of these radicals wherein some of the hydrogen atoms attached to carbon atoms are replaced by halogen atoms, and hydroxyl radicals. Illustrative, non-limiting examples of $R^1$ and X include alkyl radicals such as methyl, ethyl, propyl, isopropyl, butyl, isobutyl, tert-butyl, pentyl, hexyl, cyclohexyl, octyl, nonyl and decyl, alkenyl radicals such as vinyl, allyl, propenyl, isopropenyl, butenyl and hexenyl, aryl radicals such as phenyl and tolyl, aralkyl radicals such as benzyl and phenylethyl, halogenated hydrocarbon radicals such as chloromethyl, bromoethyl and 3,3,3-trifluoropropyl, and hydroxyl radicals. $R^1$ and X may be the same or different. Alkenyl and/or hydroxyl radicals should account for 0.001 to 1 mol %, especially 0.02 to 0.8 mol % of the entire $R^1$ and X radicals. Alkenyl and hydroxyl radicals are functional radicals contributing to crosslinking reaction. With less than 0.001 mol % of functional radicals, cured parts become weak and lack strength, failing to function as rubbery elastomer. More than 1 mol % of functional radicals leads to an excessive crosslinked density so that cured parts become brittle.

Among the functional radicals contributing to crosslinking reaction, the hydroxyl radicals are preferably attached to only the silicon atoms at both ends of the molecular chain while the alkenyl radicals may be attached to either of silicon atoms at both ends or midway of the molecular chain or both. In view of cured properties, it is preferred that there is contained at least one alkenyl radical attached to the silicon atom at both ends of the molecular chain. From the standpoints of availability and cost, X is preferably selected from vinyl and hydroxyl radicals and $R^1$ is preferably selected from methyl, phenyl, 3,3,3-trifluoropropyl and vinyl radicals.

Letter k is an integer of at least 4, preferably at least 50, more preferably at least 100. If k is 3 or less, cured parts become brittle and useless. The upper limit of k is not particularly limited although it is usually about 15,000, preferably about 8,000. The organopolysiloxane used herein may be liquid, paste or gum.

Component (B) is an organohydrogenpolysiloxane of the general formula (2) serving as a crosslinking agent or a crosslinking and foaming agent.

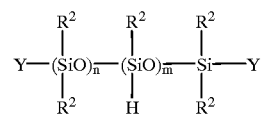

(2)

In formula (2), $R^2$ is selected from the group consisting of alkyl, aryl, and aralkyl radicals having 1 to 10 carbon atoms, preferably 1 to 8 carbon atoms, and substituted monovalent ones of these radicals wherein some of the hydrogen atoms attached to carbon atoms are replaced by halogen atoms. Y is an atom or monovalent radical selected from hydrogen atom and $R^2$ radicals. Examples of the alkyl, aryl, aralkyl and halogenated hydrocarbon radicals represented by $R^2$ or Y are the same as exemplified for $R^1$, although radicals free of an aliphatic unsaturated bond are preferred as $R^2$ or Y. The organohydrogenpolysiloxane should have at least three hydrogen atoms each attached to a silicon atom (that is, SiH radicals) in a molecule. Letter n is an integer inclusive of 0, preferably 0 to 499, more preferably 0 to 199, m is an integer of at least 1, preferably 3 to 500, more preferably 4 to 200, and the sum of m+n is an integer of 3 to 500, preferably 4 to 200.

Component (B) is a crosslinking agent capable of reacting with component (A). That is, addition reaction takes place through hydrosilylation between alkenyl radicals in component (A) and SiH radicals in component (B) or addition reaction takes place through dehydrogenation between silanol radicals in component (A) and SiH radicals in component (B). At the same time, component (B) functions as a foaming agent by incurring dehydrogenation with component (C) if any. The amount of component (B) blended is 0.1 to 50 parts, preferably 1 to 25 parts by weight per 100 parts by weight of the base polymer or component (A). Less than 0.1 part of component (B) is ineffective for crosslinking whereas more than 50 parts of component (B) is detrimental to weather resistance and crosslinking.

It is noted that when component (A) does not contain a hydroxyl radical attached to a silicon atom (that is, silanol radical) and component (C) is not blended (that is, it is unnecessary to expand the composition to foam or sponge), component (B) may be blended such that about 0.5 to 10 mol, especially about 1 to 5 mol of SiH radicals in component (B) are available per mol of alkenyl radicals in component (A).

Component (C) is a compound having active hydrogen. This component is necessary when the composition of the invention is used as an expandable composition. Component (C) is omitted if it is unnecessary to expand the composition to foam or sponge. The compound having active hydrogen is a compound having in a molecule at least one hydrogen atom (e.g., hydroxyl group) which is eliminated (dehydrogenated) through the reaction with a SiH radical in component (B) in the presence of a platinum group metal catalyst. The compound having active hydrogen may be selected from known compounds as long as they do not deactivate the catalytic activity of the platinum group metal catalysts as components (D) and (E) to be described later. Exemplary compounds having active hydrogen include water, alcohol compounds having 1 to 20, preferably 1 to 12 carbon atoms and 1 or more OH groups in a molecule, silanes having a silanol radical and siloxanes having a silanol radical and having about 2 to 50, preferably about 2 to 20 silicon atoms, such as, for example, methanol, ethanol, n-propanol, isopropanol, butanol, ethylene glycol, diethylene glycol, glycerin, trimethylsilanol, diphenylsilane diol, and compounds represented by the following formulas, alone or in admixture of two or more.

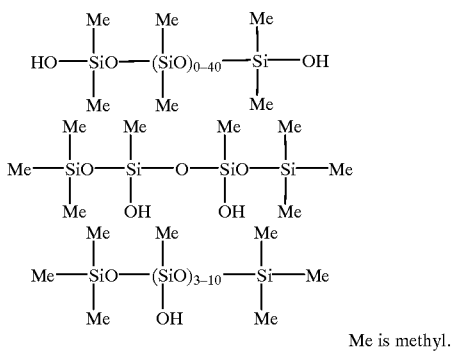

Me is methyl.

An appropriate amount of component (C) blended is 0 to 20 parts by weight per 100 parts by weight of the base polymer or component (A), and 0.1 to 20 parts, preferably 0.1 to 15 parts by weight on the same basis especially when the composition is to be expanded to foam or sponge.

Component (D) is a microcapsulated platinum group metal catalyst. In the present invention, the platinum group metal catalyst is one selected from the group consisting of platinum group metal single substances, compounds containing a platinum group metal atom and complexes derived therefrom. The platinum group metal includes platinum, palladium and rhodium, and is preferably platinum.

Component (D) is a catalyst for promoting addition reaction between components (A) and (B). For improving the shelf stability of the composition, a platinum group metal catalyst is enclosed in or microcapsulated with a compound having a melting or softening point of 40 to 200° C., which is selected from among thermoplastic organic resins, thermoplastic silicone resins, and heat-fusible compounds with a molecular weight of up to 1,000. The encapsulated platinum group metal catalyst develops the activity of platinum group metal catalyst when heated at or above the melting or softening point of the encapsulating compound, contributing to curing and/or expansion of the composition. In this sense, the melting or softening point of the thermoplastic organic resins, thermoplastic silicone resins, and heat-fusible compounds with a molecular weight of up to 1,000 should be in the range of 40 to 200° C., especially 50 to 150° C. although the exact temperature depends on a particular application or storage conditions to which the composition is subjected. With a melting or softening point of lower than 40° C., the shelf stability at room temperature is insufficient. With a melting or softening point of higher than 200° C., the shelf stability is sufficient, but curing takes a time.

The thermoplastic resins used herein include organic resins (other than silicone resins), for example, polyolefin resins, polystyrene resins, acrylic resins, and cellulosic resins. The thermoplastic silicone resins are organopolysiloxane resins of three-dimensional network structure containing a branched structure such as trifunctional siloxane units or $SiO_2$ units or both include a variety of such resins although silicone resins having phenyl or perfluoroalkyl radicals (e.g., 3,3,3-trifluoropropyl) and aliphatic unsaturated radicals such as alkenyl (e.g., vinyl, allyl or propenyl) are preferred. The heat-fusible compounds with a molecular weight of up to 1,000 are heat-fusible compounds other than the above-mentioned thermoplastic organic resins and thermoplastic silicone resins, examples of which include 2-butyne-1,4-diol, diphenylacetylene, 4-hexylresorcin, 2-vinylnaphthalene, 2-acetyl-1-tetralone, 2,5-diphenyloxazole, 3,6-dichloropyridazine, 2,5-toluquinone, 3,6-dimethyl-4-octyne-3,6-diol, bis(2,2,6,6-tetramethyl-4-pyperidinyl)sebcate, 3,3'-thiodipropionic acid-di-n-octadecyl, 2,4,7,9-tetramethyl-5-decyne-4,7-diol, 2,5-dimethyl-3-hexyne-2,5-diol, 1,3-bis(trimethylsilylethynyl)benzene, and thiochroman-4-ol.

The platinum group metal catalyst to be enclosed in the resin or heat-fusible compound includes catalysts containing platinum group metals such as platinum, rhodium and palladium, especially platinum. Conventional well-known addition reaction catalysts, for example, platinum black, chloroplatinic acid and complexes derived therefrom are useful. Illustrative examples include platinum black, chloroplatinic acid, alcohol-modified products of chloroplatinic acid, and complexes of chloroplatinic acid with olefins, aldehydes, vinyl siloxanes, acetylene and acetylene alcohols.

Included in component (D) are platinum group metal catalysts enclosed in silicone resins as described in JP-A 134786/1974 and 46962/1992, with silicone resins having both phenyl or perfluoroalkyl radicals and aliphatic unsaturated radicals being preferred. Other useful examples include platinum group metal catalysts enclosed in thermoplastic organic resins such as polystyrene and polyolefins as described in JP-A 47442/1989 corresponding to U.S. Pat. No. 4,784,879, and platinum group compounds enclosed in heat-fusible compounds having a molecular weight of up to 1,000 falling outside the scope of the above-mentioned thermoplastic organic resins.

In preparing platinum group metal catalysts enclosed in heat-fusible compounds, for example, any of well-known methods described in the above-referred patents may be used. For example, the enclosed catalyst is prepared by contacting a platinum group catalyst with a heat-fusible compound in a molten or dissolved state. The molten state is obtained by heating the compound at or above its melting point. The dissolved state is obtained by uniformly dissolving or dispersing the compound in a solvent. The platinum group catalyst is carried on the compound in either state. The mass is solidified by cooling or distilling off the solvent. There is obtained a solid catalyst having the platinum group catalyst uniformly dispersed therein. Alternative methods include a spray drying method in which the mass in a liquid state resulting from melting or dissolution is sprayed in mist, followed by solidification or solvent removal to yield microparticulates; an emulsifying method in which the mass is emulsified in water with the aid of an emulsifier, obtaining a solid catalyst; and a freeze drying method in which the mass dissolved in the solvent is cooled below the solidification temperature of the solvent, followed by solvent removal in vacuum to yield a solid catalyst. The thus obtained solid catalyst may take a powder form or a slurry or paste form by dispersing it in silicone fluid again.

The amount of component (D) blended is to supply 1 to 1,000 parts, preferably 5 to 200 parts by weight of platinum group metal atom per million parts by weight of the entire composition.

Component (E) is a platinum group metal catalyst. The platinum group metal catalyst has the meaning defined above and is not enclosed in a thermoplastic organic resin, thermoplastic silicone resin and heat-fusible compound. It serves to complement the function of component (D) for promoting addition reaction. More particularly, component (E) is effective for improving initial curing and initial expansion and eliminating the surface tack which is otherwise left when cables and tubes are molded and vulcanized at a high speed.

Component (E) may be any of conventional well-known platinum group metal catalysts. As opposed to component (D), the catalyst of component (E) need not be, or rather, ought not to be enclosed in thermoplastic resins, thermoplastic silicone resins or heat-fusible compounds. The catalyst is blended in the composition without further treatment. Illustrative examples include platinum black, chloroplatinic acid, alcohol-modified products of chloroplatinic acid, and complexes of chloroplatinic acid with olefins, aldehydes, vinyl siloxanes, acetylene and acetylene alcohols.

The amount of component (E) blended is such that the weight of platinum group metal in component (E) is up to $\frac{1}{10}$, preferably up to $\frac{1}{20}$ of the weight of platinum group metal available from component (D). The lower limit is 0.001% by weight, preferably 0.1%, especially 1% of the weight of platinum group metal available from component (D). If the weight ratio of platinum group metal in component (E) to component (D) exceeds $\frac{1}{10}$, the compromise between shelf stability and curing capability is disrupted. If the metal content in component (E) is less than 0.001% of that of component (D), the effect achieved by components (D) and (E) combined would be lost.

Component (F) is an addition reaction retarder which is effective for controlling the extent of reaction promoted by the platinum group metal atoms from component (E). Prior art well-known retarders may be used. Examples include benzotriazole compounds (JP-B 25069/1965 corresponding to U.S. patent application Ser. No. 202,974 filed on Jun. 18, 1962), acetylene alcohol compounds (JP-B 31476/1969 corresponding to U.S. Pat. No. 3,445,420), vinyl-containing polysiloxane compounds (JP-B 10947/1973 corresponding to U.S. Pat. No. 3,699,073), hydroperoxides (JP-B 20340/1982 corresponding to U.S. Pat. No. 4,061,609), and amine compounds (JP-A 56563/1988 corresponding to U.S. Pat. Nos. 4,785,066 and 5,004,792), with the acetylene and acetylene alcohol compounds being preferred. More illustrative examples of the retarder are 3-methyl-1-butyn-3-ol, 3-methyl-1-pentyn-3-ol, ethynyl cyclohexanol, and 3,5-dimethyl-1-hexyn-3-ol.

An appropriate amount of the retarder blended may vary depending on the structure and molecular weight thereof although it is usually 0.001 to 20 parts, especially 0.002 to 5 parts by weight per 100 parts by weight of component (A). Basically, the amount of the retarder is about 1 to 1,000 equivalents, preferably about 2 to 500 equivalents, based on the platinum group metal atoms supplied as component (E).

Component (G) is a filler which is optionally blended for extending or reinforcing purposes and further for the purpose of imparting flame retardance, thermal or electrical conduction. Exemplary fillers are fumed or fired silica, precipitated silica, ground crystalline silica, colloidal calcium carbonate, precipitated calcium carbonate, heavy calcium carbonate, acetylene black, furnace carbon, titanium oxide, metals, and metal oxides, which may be surface treated with silane or siloxane compounds. An appropriate amount of component (G) blended is 0 to 1,000 parts, preferably 1 to 1,000 parts, more preferably 1 to 400 parts by weight per 100 parts by weight of component (A). Blending of more than 1,000 parts of component (G) is difficult and results in cured parts which are brittle and have poor mechanical properties.

In addition to the above-mentioned components (A) to (G), the composition of the invention may further contain well-known additives if desired and insofar as the objects of the invention are not impaired. Such additives include thixotropy modifiers, adhesion modifiers, silicone fluids as plasticizers, and silicone resins containing $R_3SiO_{1/2}$ and $SiO_2$ units in a basic structure and silicone resins containing $RSiO_{3/2}$ units in a basic structure for strength reinforcement wherein R is a monovalent hydrocarbon radical of $C_1$–$C_8$ such as alkyl, alkenyl or aryl.

As the adhesion modifiers, carbon functional silanes or siloxanes having reactive radicals are useful. For example, use may be made of (tri)alkoxysilanes having a reactive radical such as an epoxy or acryl functional radical and partially hydrolyzed condensates thereof, for example, γ-glycidoxypropyltrimethoxysilane, γ-acryloxypropyltrimethoxysilane, and γ-methacryloxypropyltrimethoxysilane; trialkoxysilyl endblocked methylhydrogenpolysiloxane, trimethoxysilylpropyl-modified cyclic methylhydrogenpolysiloxane, and triallyl isocyanurate. The amount of the adhesion modifier blended may be 0 to about 50 parts, preferably about 0.01 to about 50 parts, more preferably about 0.01 to about 10 parts by weight per 100 parts by weight of component (A).

Although conditions under which the composition of the invention is cured may be selected in accordance with a particular application, typical curing conditions include a temperature of about 60 to 150° C. and a time of about 2 to 120 minutes.

There has been described an organopolysiloxane composition finding a good compromise between shelf stability and curing capability.

EXAMPLE

Examples of the invention are given below by way of illustration and not by way of limitation. All parts are by weight.

Catalyst Synthesis Example 1

To a toluene solution of a siloxane-modified platinum complex containing 5,000 ppm of platinum atom, a phenyl and vinyl-containing silicone resin containing $C_6H_5SiO_{3/2}$ and $(CH_2=CH)SiO_{3/2}$ units and having a melting point of 78° C. was added in an amount equal to the toluene. They were agitated until uniform. The mixture was spray dried, obtaining a resin powder platinum catalyst (platinum atom content: 5,000 ppm), designated Catalyst 1.

Catalyst Synthesis Example 2

To 5 g of 3,6-dimethyl-4-octyne-3,6-diol (m.p. 54° C.) was added 5 g of a vinyl-containing siloxane complex derived from chloroplatinic acid. The mixture was heat treated at 80° C. for one hour, stripped, and cooled, yielding a solid hydrosilylation catalyst (platinum atom content: 5,000 ppm), designated Catalyst 2.

Catalyst Synthesis Example 3

To 5 g of 1,3-bis(trimethylsilylethynyl)benzene (m.p. 58° C.) was added 5 g of a vinyl-containing siloxane complex derived from chloroplatinic acid. The mixture was heat treated at 80° C. for one hour. The mixture was emulsified in water along with 0.5 g of a polyglycerine surfactant, followed by filtration and drying, yielding a fine powder hydrosilylation catalyst (platinum atom content: 5,000 ppm), designated Catalyst 3.

Example 1

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m²/g. They were mixed until uniform, obtaining a base compound.

To 100 parts of the base compound were added 2.0 parts (100 ppm of platinum based on the base compound) of Catalyst 1 obtained in Catalyst Synthesis Example 1, 0.1 part (5.0 ppm of platinum based on the base compound) of the toluene solution of siloxane-modified platinum complex used in Catalyst Synthesis Example 1, and 0.002 part of 2-ethylhexanol. The ingredients were mixed in the universal mixer until uniform. Further, 16 parts of methylhydrogenpolysiloxane blocked with a trimethylsilyl radical at each end and containing 0.005 mol/g of SiH radicals was added to the mixture. This was further mixed, obtaining Composition 1 (platinum atom in component (E) being 0.05% by weight of platinum atom in component (D)).

Example 2

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m²/g. They were mixed until uniform, obtaining a base compound.

To 100 parts of the base compound were added 0.2 part of water, 1.0 part (50 ppm of platinum based on the base compound) of Catalyst 1, 0.01 part (0.5 ppm of platinum based on the base compound) of the toluene solution of siloxane-modified platinum complex used in Catalyst Synthesis Example 1, and 0.002 part of 2-ethylhexanol. The ingredients were mixed in the universal mixer until uniform. Further, 5 parts of methylhydrogenpolysiloxane blocked with a trimethylsilyl radical at each end and having a viscosity of 40 centipoise at 25° C. (SiH radical content 0.016 mol/g) and 0.3 part of phenylsilane were added to the mixture. This was further mixed, obtaining Composition 2 (platinum atom in component (E) being 0.01% by weight of platinum atom in component (D)).

Example 3

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m²/g. They were mixed until uniform, obtaining a base compound.

To 100 parts of the base compound were added 0.2 part of water, 1.0 part (50 ppm of platinum based on the base compound) of Catalyst 2, 0.01 part (0.5 ppm of platinum based on the base compound) of the toluene solution of siloxane-modified platinum complex used in Catalyst Synthesis Example 1, and 0.002 part of 2-ethylhexanol. The ingredients were mixed in the universal mixer until uniform. Further, 5 parts of methylhydrogenpolysiloxane blocked with a trimethylsilyl radical at each end and having a viscosity of 40 centipoise at 25° C. (SiH radical content 0.016 mol/g) and 0.3 part of phenylsilane were added to the mixture. This was further mixed, obtaining Composition 3 (platinum atom in component (E) being 0.01% by weight of platinum atom in component (D)).

Comparative Example 1

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m²/g. They were mixed until uniform, obtaining a base compound.

To 100 parts of the base compound was added 2.1 parts (105 ppm of platinum based on the base compound) of Catalyst 1. The ingredients were mixed in the universal mixer until uniform. Further, 16 parts of methylhydrogenpolysiloxane blocked with a trimethylsilyl radical at each end and containing 0.005 mol/g of SiH radicals was added to the mixture. This was further mixed, obtaining Composition 4.

Comparative Example 2

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m²/g. They were mixed until uniform, obtaining a base compound.

To 100 parts of the base compound were added 2.1 parts (105 ppm of platinum based on the base compound) of the toluene solution of siloxane-modified platinum complex used in Catalyst Synthesis Example 1 and 0.002 part of 2-ethylhexanol. The ingredients were mixed in the universal mixer until uniform. Further, 16 parts of methylhydrogenpolysiloxane blocked with a trimethylsilyl radical at each end and containing 0.005 mol/g of SiH radicals was added to the mixture. This was further mixed, obtaining Composition 5.

Comparative Example 3

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m$^2$/g. They were mixed until uniform, obtaining a base compound.

To 100 parts of the base compound were added 2.1 parts (105 ppm of platinum based on the base compound) of Catalyst 1 and 0.002 part of 2-ethylhexanol. The ingredients were mixed in the universal mixer until uniform. Further, 16 parts of methylhydrogenpolysiloxane blocked with a trimethylsilyl radical at each end and containing 0.005 mol/g of SiH radicals was added to the mixture. This was further mixed, obtaining Composition 6.

Comparative Example 4

A universal mixer was charged with 100 parts of dimethylpolysiloxane blocked with a vinyldimethylsilyl radical at each end of its molecular chain and having a viscosity of 30,000 centipoise at 25° C. and 10 parts of fumed silica surface treated with dichlorosilane and having a specific surface area of 130 m$^2$/g. They were mixed until uniform, obtaining a base compound.

To 100 parts of the base compound were added 0.2 part of water, 1.01 parts (50.5 ppm of platinum based on the base compound) of Catalyst 2 and 0.002 part of 2-ethylhexanol. The ingredients were mixed in the universal mixer until uniform. Further, 5 parts of methylhydrogenpolysiloxane blocked with a trimethylsilyl radical at each end and having a viscosity of 40 centipoise at 25° C. (SiH radical content 0.016 mol/g) and 0.3 part of phenylsilane were added to the mixture. This was further mixed, obtaining Composition 7.

Example 4

A universal mixer was charged with 100 parts of dimethylpolysiloxane blocked with a hydroxyl radical at each end of its molecular chain and having a viscosity of 20,000 centipoise at 25° C. and 10 parts of fumed silica surface treated with dichlorosilane and having a specific surface area of 130 m$^2$/g. They were mixed until uniform, obtaining a base compound.

To 100 parts of the base compound were added 0.2 part of water, 1.0 part (50 ppm of platinum based on the base compound) of Catalyst 3, 0.01 part (0.5 ppm of platinum based on the base compound) of the toluene solution of siloxane-modified platinum complex used in Catalyst Synthesis Example 1, and 0.002 part of 2-ethylhexanol. The ingredients were mixed in the universal mixer until uniform. Further, 5 parts of methylhydrogenpolysiloxane blocked with a trimethylsilyl radical at each end and having a viscosity of 40 centipoise at 25° C. (SiH radical content 0.016 mol/g) was added to the mixture. This was further mixed, obtaining Composition 8 (platinum atom in component (E) being 0.01% by weight of platinum atom in component (D)).

The thus obtained Compositions 1 to 8 were tested as follow.

First, Example 1 and Comparative Examples 1, 2 and 3 were examined for cure using a curelastometer. The results are shown in Table 1.

TABLE 1

|  | 10% torque time (min.) | 90% torque time (min.) | 90% torque time − 10% torque time (min.) |
|---|---|---|---|
| Example 1 | 5.0 | 6.5 | 1.5 |
| Comparative Example 1 | 4.2 | 7.5 | 3.3 |
| Comparative Example 2 | 0.8 | 1.6 | 0.8 |
| Comparative Example 3 | 6.0 | 10.5 | 4.5 |

As seen from Table 1, the composition of Comparative Example 1 using only the conventional microcapsulated platinum catalyst (that is, component (D)) took more than 3 minutes from the start to the end of curing. The composition of Comparative Example 2 using the untreated platinum catalyst (that is, component (E)) and a minor amount of the retarder briefly started curing, indicating a failure to provide a sufficient pot life at room temperature. When stored at room temperature, the same composition of Comparative Example 2 gelled within 3 hours. The composition of Comparative Example 3 using the microcapsulated platinum catalyst (that is, component (D)) and the retarder showed a longer 10% torque time than Comparative Example 1, but a very long time between the 10% torque time and the 90% torque time, indicating an excessive time until the end of curing.

In contrast, Example 1 had a longer pot life than Comparative Example 1, but required a shorter time until the end of curing, indicating a long pot life and fast curing properties. Depending on the concentration of microcapsulated platinum catalyst (component (D)), the amount of retarder (component (F)) added later, and the amount of the platinum catalyst (component (E)) added, a composition having the desired pot life and cure speed can be prepared.

The compositions of Examples 2, 3 and 4 and Comparative Example 4 were cured and expanded to foam or sponge at 120° C. for 20 minutes. The cells of the expanded foams were compared, with the results shown in Table 2.

TABLE 2

|  | E2 | E3 | CE4 | E4 |
|---|---|---|---|---|
| Before curing | micro-foaming | micro-foaming | no foaming | micro-foaming |
| Cells after curing | ≦1 mm fine and even cells | ≦1 mm fine and even cells | ≧2 mm large and uneven cells | ≦1 mm fine and even cells |

Japanese Patent Application No. 335150/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane composition comprising:

(A) 100 parts by weight of an organopolysiloxane of the following general formula (I):

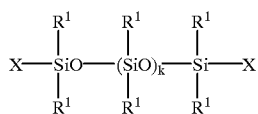

(1)

wherein $R^1$ and X are independently selected from the group consisting of alkyl, aryl, aralkyl, and alkenyl radicals having 1 to 10 carbon atoms, substituted ones or these radicals wherein some of the hydrogen atoms attached to carbon atoms are replaced by halogen atoms, and hydroxyl radicals, k is an integer of at least 4, alkenyl or hydroxyl or both radicals account for 0.001 to 1 mol % of the entire $R^1$ and X radicals, (B) 0.1 to 50 parts by weight of an organohydrogenpolysiloxane having at least three hydrogen atoms each attached to a silicon atom in a molecule, represented by the following general formula (2):

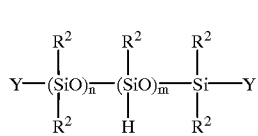

(2)

wherein $R^2$ is selected from the group consisting of alkyl, aryl, and aralkyl radicals having 1 to 10 carbon atoms, and substituted monovalent ones of these radicals wherein some of the hydrogen atoms attached to carbon atoms are replaced by halogen atoms, Y is hydrogen or $R^2$, m is an integer of at least 1, n is an integer inclusive of 0, the sum of m+n is an integer of 3 to 500, (C) 0 to 20 parts by weight of a compound having an active hydrogen radical, (D) a platinum group metal catalyst enclosed in a compound selected from the group consisting of thermoplastic organic resins; thermoplastic silicone resins, and heat-fusible compounds with a molecular weight of up to 1,000, all having a melting or softening point of 40 to 200° C., in an amount to give 1 to 1,000 parts by weight of platinum group metal atom per million parts by weight of the entire composition, (E) a platinum group metal catalyst in an amount to provide platinum group metal in an amount of from 1/100,000 up to 1/10 (by weight) of the amount of platinum group metal available from component (D), (F) 0.001 to 20 parts by weight of an addition reaction retarder, and (G) 0 to 1,000 parts by weight of a filler.

2. A composition as claimed in claim 1, wherein $R^1$ and X are independently selected from the group consisting of alkyl, aryl, aralkyl, and alkenyl radicals having 1 to 8 carbon atoms, and substituted ones of these radicals wherein some of the hydrogen atoms attached to carbon atoms are replaced by halogen atoms.

3. A composition as claimed in claim 1, wherein alkenyl or hydroxyl or both radicals account for 0.02 to 0.8 mol % of the entire $R^1$ and X radicals.

4. A composition as claimed in claim 1, wherein X is a vinyl or hydroxyl radical.

5. A composition as claimed in claim 1, wherein $R^1$ is a methyl, phenyl, 3,3,3-trifluoropropyl or vinyl radical.

6. A composition as claimed in claim 1, wherein k is at least 50.

7. A composition as claimed in claim 1, wherein k is at least 100.

8. A composition as claimed in claim 1, wherein k is less than 15,000.

9. A composition as claimed in claim 8, wherein k is less than 8,000.

10. A composition as claimed in claim 1, wherein $R^2$ is selected from the group consisting of alkyl, aryl, and aralkyl radicals having 1 to 8 carbon atoms, and substituted monovalent ones of these radicals wherein some of the hydrogen atoms attached to carbon atoms are replaced by halogen atoms.

11. A composition as claimed in claim 1, wherein n is an integer from 0 to 499.

12. A composition as claimed in claim 1, wherein n is an integer from 0 to 199.

13. A composition as claimed in claim 1, wherein m is from 3 to 500.

14. A composition as claimed in claim 1, wherein component (B) is present in an amount of from 1 to 50 parts by weight per 100 parts per weight of component (A).

15. A composition as claimed in claim 1, wherein component (B) is present in an amount of from 1 to 25 parts by weight per 100 parts per weight of component (A).

16. A composition as claimed in claim 1, wherein the compound enclosing the platinum group metal catalyst has a melting or softening point of 50 to 150° C.

17. A composition as claimed in claim 1, wherein the a platinum group metal catalyst comprises platinum, rhodium, or palladium.

18. A composition as claimed in claim 1, wherein the platinum group metal catalyst component (E) is present in an amount to provide platinum group metal in an amount of up to 1/20 by weight of the amount of platinum group metal available from component (D).

19. A composition as claimed in claim 1, wherein the platinum group metal catalyst component (E) is present in all amount greater than 0.1% by weight.

20. A composition as claimed in claim 1, wherein the platinum group metal catalyst component (E) is present in an amount greater than 1% by weight.

* * * * *